Sept. 14, 1965   R. T. LOVRENICH   3,206,610
CONVERTER FOR BATTERY CHARGING CIRCUITS
Filed Feb. 18, 1963

INVENTOR.
RODGER THOMAS LOVRENICH
BY
Souther & Stoltenberg
ATTORNEYS

United States Patent Office 3,206,610
Patented Sept. 14, 1965

3,206,610
CONVERTER FOR BATTERY CHARGING
CIRCUITS
Rodger Thomas Lovrenich, Detroit, Mich., assignor to Eltra Corporation, a corporation of New York
Filed Feb. 18, 1963, Ser. No. 259,111
10 Claims. (Cl. 290—38)

This invention relates to battery charging systems for trucks, more particularly to a charging system for a supplemental energy source consisting of several series-connected batteries provided to obtain a higher voltage for the starting motor for a truck engine under cold ambient conditions, whereby the charging energy for the series-connected batteries at suitable voltage is obtained automatically from the standard electrical system of the truck operating at a lower standard voltage.

Under cold ambient conditions, where temperatures of the order of 0° F. or less obtain, the starting conditions for large engines of trucks present a burdensome problem. The solution to this problem usually involves the use of supplemental batteries of standard automotive types to obtain a relatively high voltage of approximately twice that of the standard electrical system of the truck, which voltage is applied to the starting motor to give the additional torque necessary for turning over the engine at speeds adequate to insure the starting thereof. These batteries, which are series-connected for the starting operation, must necessarily be charged in order to supply the energy which has been drawn from them during the starting operation, so that they will not be depleted for the next subsequent starting operation. In order to attain this objective, the batteries were previously connected in a parallel arrangement so that the charging voltage in a standard electrical circuit for the truck could be utilized for charging the extra batteries which are used solely for the starting operation. Generally, a series-parallel switch has been provided for this purpose to change the connections of the battery from a starting circuit where the batteries are in series, to a parallel connection when the batteries were on charge from the standard electrical system of the truck. These series-parallel switches were necessarily of robust construction inasmuch as currents of the order of 300 amps would be carried by their contact points during the starting operation. In order to fulfill these requirements, the switches were expensive to fabricate and required constant attention in order that their efficiency remained high, to keep the electrical resistance to the high currents at a minimum.

The present invention contemplates the provision of a charging circuit for these supplemental starting batteries which completely obviates the use of the series-parallel switch alluded to above, to provide a charging means which has no moving parts and which is completely automatic in its operation. The invention further contemplates the provision of a charging arrangement which utilizes voltage inverters with static components wherein the charging circuit for series-connected supplemental batteries for the starting arrangements for the engine are electrically isolated from the standard electrical system of the truck.

It is, therefore, a principal object of this invention to provide a charging circuit for supplemental series-connected batteries which are used solely for starting purposes, which provides electrical charging energy to these batteries from a circuit which is electrically isolated from the standard electrical circuit of the truck from which the charging energy for these batteries is initially obtained, and which is completely automatic in its operation.

It is a further object of this invention to provide a charging system for series-connected supplemental starting batteries from a stand-by charging circuit which derives its energy from the standard electrical system of the truck, the voltage of which is converted from a relatively low D.C. potential of the standard system through an inverter to a relatively high D.C. potential which is used for charging the supplemental batteries in series-connection.

It is a further object of this invention to provide an automatic system for a supplemental starting potential for starter motors consisting of series-connected auxiliary batteries, which are automatically charged by energy derived from the standard electrical system of the truck through a means which electrically isolates the two circuits and yet is completely automatic in its charging operation.

Other objects and advantages of this invention relating to the arrangement, operation and function of the related elements of the structure, to various details of construction, to combinations of parts and to economies of manufacture will be apparent to those skilled in the art upon consideration of the following description and appended claims, reference being had to the accompanying drawings forming a part of this specification wherein like reference characters designate corresponding parts in the several views.

Referring to the drawings.

Figure 1:
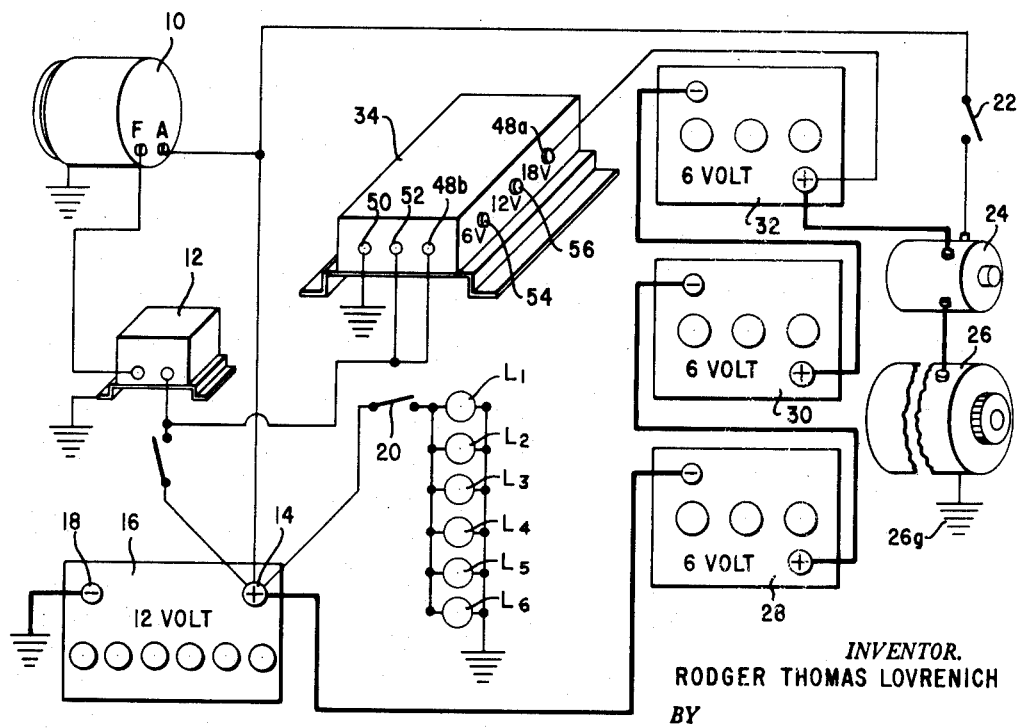
FIG. 1 is a schematic diagram of connections, showing the cooperative relation between the standard electrical system of the vehicle and the supplemental starting circuit.

Referring to the drawings, particularly to FIG. 1, a source of electrical energy is provided, preferably consisting of an alternator 10 but a D.C. generating unit may also be used, which is driven by the engine of the automotive vehicle (not shown), to which the system is applied. The generator unit 10 is provided with two binding posts, the first of which (A), is connected to the main power charging circuit, which, in the alternator, is the output terminal of the rectifying means normally mounted within the casing of the alternator 10. The second binding post F is in electric circuit with the exciting magnetic field coil of the generating unit 10 which, in the alternator, is the coil mounted on the rotating armature member which is driven by the engine of the vehicle. The binding post F is in circuit with a regulating means 12, either a vibratory or static type, which is responsive to the voltage generated by the generating unit at the binding post A, to control the field current of the generating unit to maintain the output voltage within predetermined limits. The binding post A is in direct connection with the positive terminal post 14 of a standard 12-volt automotive battery 16, which is the standard voltage at which electrical systems of automotive vehicles are designed to operate. The negative terminal post of the battery 16 is grounded in the well-known manner, with the frame of the generator unit being also grounded to complete the charging circuit for the standard 12-volt battery supplying the normal electrical circuits of the vehicle. The field coil in circuit with the binding post F is also grounded in the well-known manner.

The terminal post 14 of the battery 16 is in circuit with switch 20, which, when actuated, applies the battery potential to load devices L1–L6 which may include such standard loading devices on automotive vehicles as the ignition circuit, the lighting circuits, and various other load circuits including devices which are well known. The binding post 14 on the battery 16 is also in circuit with a second switch 22, which, when closed, energizes the solenoid of a starting switch 24 which, when its contacts are closed, establishes an electrical power circuit through a starting motor 26, which is actuated thereby to provide a driving relation with the ring gear of the automotive vehicle for purpose of starting the engine thereof. The main starting circuit includes three 6-volt batteries, 28, 30, and 32, which are connected in series with the starting motor, the solenoid switch 24, and the standard battery 16 already described. The starter motor is grounded at 26g, which, with the negative ground of the negative terminal 18 of the standard battery 16, completes the starting circuit.

The batteries 28, 30, and 32 are portable and may be of standard automotive type construction, preferably having a 6-volt potential, so that the potential of each of the 6-volt batteries, 28, 30, and 32 is added to the voltage of the standard 12-volt battery 16 to provide a starting voltage of 30 volts which gives the starting motor a sufficiently high energy input to provide the required torque to turn over the engine of the automotive vehicle under the most burdensome conditions, particularly with ambient temperatures which are at zero degree F. or less.

Inasmuch as the voltage generated by the generating unit 10 varies between relatively narrow limits such as from 10 to 15 volts, due to the action of the regulating means 12, it is obvious that the batteries 28, 30, 32 and 16 cannot be charged directly by the generating unit 10 when the batteries are connected in series as shown in FIG. 1. At the same time, it is very desirable that the series-connection of these batteries be maintained at all times inasmuch as the current which flows through the batteries and the starting circuit during a starting period is of a relatively high order, and may be as high as 300 amperes for short periods of time when the first inrush of current to the starter motor 26, upon the closing of the solenoid switch 24, traverses the starting circuit. If switching devices are provided in this series circuit to change the connections to parallel, they are generally inefficient due to the fact that the electrical resistance at the contact points is very difficult to maintain at a minimum.

In order to obviate this difficulty, the invention provides a means whereby the starting circuit is always series-connected with the voltage of the generating unit 10, which is normally designed to apply charging current only to the standard battery 16, which it closely approximates is converted to a higher voltage by a pulsating device and a transformer means which is positioned in box 34, as shown in FIG. 1. The details of this device are shown in a schematic diagram of connections in FIG. 2.

A transformer means TR is provided having a common laminated iron core 40 which may be of any type such as EI laminations, on which are mounted four primary coils P1, P2, P3, and P4. These primary coils are connected in series in pairs with center taps in push-pull arrangement with a pair of P-N-P transistors T1 and T2 which convert the D.C. current derived from battery 16 and the generating unit 10 into a pulsating current which activates the magnetic core of the transformer means TR to energize secondary coils S1, S2, and S3 which are connected in series having center tap 42 for a 6-volt connection and tap 44 for a 12-volt connection, and tap 46 for an 18-volt connection. The current which is derived from the secondary is an alternating current which is applied to a bridge-connected full-wave rectifying device 48 as shown in FIG. 2 with the rectified current being taken from the side terminals 48a and 48b of the bridge connection as is well known in the art and connected in a charging circuit with the batteries 28, 30, and 32 as shown in FIG. 1.

The primary circuit is provided with resistances R1 and R2 and capacitor C to cooperate with the primary coils and the transistors T1 and T2 to provide the push-pull connection for pulsating the D.C. current which is well known in the art, and need not be described in further detail. The transformer device, the transistors, the condenser, the resistors and the rectifying device are all mounted in the box 34 shown in FIG. 1 for convenient application to an automotive vehicle and also for protecting the components from atmospheric conditions. If desired, the bridge-connected rectifying device may also be positioned inside of the box 34 and all of the components may be encapsulated in suitable insulating material.

Figure 2:
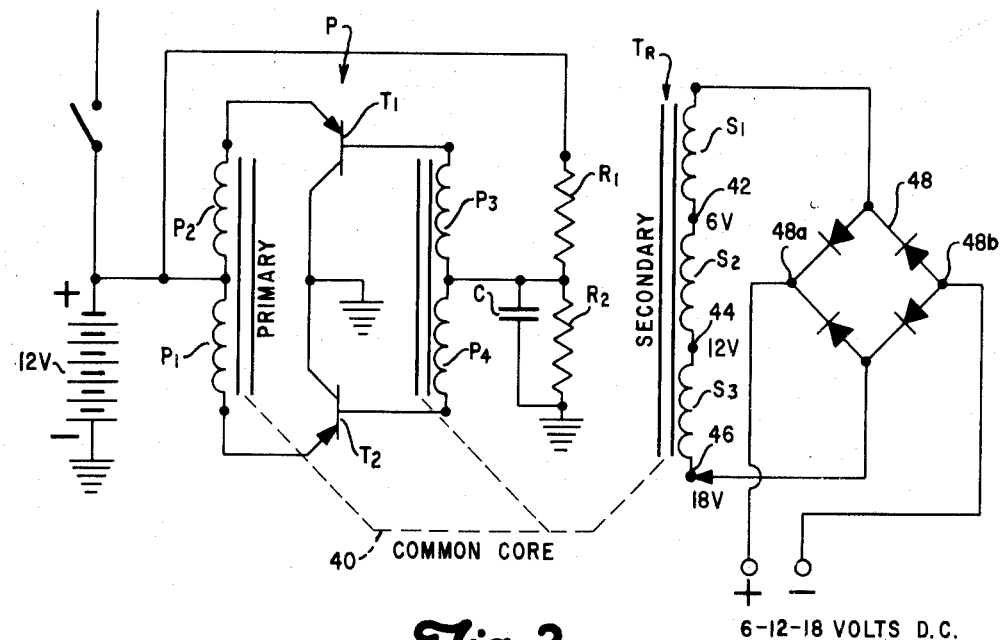
FIG. 2 is a schematic diagram of connections of the inverter and rectifying means shown in FIG. 1.

Referring now to FIG. 1, it will be noted that the box 34 is provided with six terminals, of which binding posts 50 and 52 provide the primary input to the circuit shown in FIG. 2 which provides the D.C. energy for the primary coils P1, P2, P3 and P4 which is pulsated by the transistors in their push-pull relation with the primaries. The pulsating D.C. energy which is derived from the 12-volt battery 16 and the generating unit 10 has a substantially uniform voltage due to regulating device 12, as already described, which uniform voltage energizes the transformer primaries after being pulsated preferably at a frequency of approximately 1500 cycles per second to in turn energize the secondaries S1, S2 and S3. The voltage of the alternating current created in the secondaries is controlled by the design of the transformer and the ratios of the turns between the primaries and the secondaries in a well-known manner which need not be described in further detail. The voltage regulation of the D.C. energy in the primary obtained by the use of the regulating device 12 with reference to the generating unit 10 stabilizes the voltage conditions throughout the circuit and regulates, at the same time, the voltages obtained from the secondary coils impressed upon the rectifying device 48. The secondaries, as shown in FIG. 2, are all connected in series in order to obtain the full 18 volts which is applied to the regulating device 48 to obtain the necessary voltage to charge the three auxiliary batteries 28, 30, and 32, as shown in FIG. 1. In the event only one supplemental battery 32 is to be used in the starting circuit, the inverter-rectifying unit mounted in the box 34 has a terminal tap 54 for the charging circuit at 6 volts and, if two supplemental batteries 30 and 32 are to be used, a second tap 56 is provided for the 12-volt charging potential.

Inasmuch as the charging circuits for the three 6-volt batteries 28, 30, and 32, obtain their energy from the secondaries of the transformer TR they are electrically isolated from the primary energy-producing sources, namely, the generating unit 10 and the 12-volt battery 16 which energize the primaries of the transformer. This obviates the use of complex switching arrangements between the two circuits and, at the same time, creates a condition wherein the action of the charging devices is completely automatic and only requires that the generating unit 10 be driven by the prime mover in the normal manner with its output voltage controlled by the regulating unit 12 in the normal operation of the automotive vehicle.

It is to be understood that the above detailed description of the present invention is intended to disclose an embodiment thereof to those skilled in the art, but that the invention is not to be construed as limited in its application to the details of construction and arrangement of parts illustrated in the accompanying drawings since the invention is capable of being practiced and carried out in various ways without departing from the spirit of the invention. The language used in the specification relating to the operation and function of the elements of the invention is employed for purposes of description and not of limitation, and it is not intended to limit the scope of the following claims beyond the requirements of the prior art.

What is claimed:

1. In a charging system for a supplemental starting battery for trucks having a potential substantially above the standard voltage of its electrical system, a combination comprising, a generating unit operating at the standard voltage of the electrical system of the vehicle providing a D.C. source to operate the electrical system of the vehicle including the charging of a standard storage battery, means to convert the D.C. current into a pulsating current including transistors, a transformer having a primary energized by said pulsating current and a seconary electrically isolated from said primary to provide an alternating voltage of a desired higher voltage, and rectifier means to rectify the alternating current to D.C. current for charging said supplemental starting battery.

2. In an electrical system for an automotive vehicle, a standard electrical circuit including a source of electrical energy, a standard battery, an ignition system and other loading devices; a supplemental starting circuit including the standard battery, several additional batteries all connected in series with the standard battery, and a starting motor capable of being connected to the batteries during a starting period; and a charging circuit cooperating with the standard electrical circuit for deriving energy therefrom and connected to the supplemental starting circuit for charging the several additional batteries at a potential higher than the standard battery, said charging circuit having means for electrically isolating the two circuits from each other.

3. In a charging system for heavy duty vehicles using a standard D.C. battery power supply, a standard electrical generator operated at a standard voltage of the system to charge the battery of the standard power supply; a supplemental battery power supply for starting connected in series with the standard D.C. battery power supply, said supplemental power supply having a potential substantially above the standard voltage of the standard power supply; and means to charge the batteries of said starter power supply by converting the D.C. current to a pulsating current and means to transform the pulsating current to a higher voltage and to rectify the current to D.C. current to charge said batteries of the starter power supply.

4. In a charging system for a supplemental starting battery for trucks having a potential substantially above the standard voltage of its electrical system, a combination comprising, a generating unit operating at the standard voltage of the electrical system of the vehicle providing a D.C. source to operate the electrical system of the vehicle including the charging of a standard storage battery connected in series with the supplemental starting battery, means to convert the D.C. current into a pulsating current including transistors in push-pull connection, a transformer having a primary energized by said pulsating current and a secondary isolated from said primary to provide an alternating voltage of a desired higher voltage, and rectifier means to rectify the alternating current to D.C. current for charging said supplemental starting battery.

5. In a charging system for a supplemental starting battery for trucks having a potential substantially above the standard voltage of its electrical system, a combination comprising, a generating unit operating at the standard voltage of the electrical system of the vehicle providing a D.C. source to operate the electrical system of the vehicle including the charging of a standard storage battery connected in series with the supplemental starting battery, means to convert the D.C. current into a pulsating current including switching transistors in push-pull connection, a transformer having a primary energized by said pulsating current and a secondary to provide an alternating voltage of a desired higher voltage, and rectifier means to rectify the alternating current to D.C. current for charging said supplemental starting battery, said transformer electrically isolating the standard electrical system from the supplemental starting battery circuit.

6. In a charging system for a supplemental starting battery for trucks having a potential substantially above the standard voltage of its electrical system, a combination comprising, a generating unit operating at the standard regulated voltage of the electrical system of the vehicle providing a D.C. source to operate the electrical system of the vehicle including the charging of a standard storage battery connected in series with the supplemental starting battery, means to convert the D.C. current from the generating unit into a pulsating current including two switching transistors in push-pull connection, a transformer having a primary energized by said pulsating current from the generating unit and a secondary to provide an alternating voltage of a desired higher voltage, and rectifier means to rectify the alternating current to D.C. current for charging said supplemental starting battery, said transformer electrically isolating the two circuits allowing completely automatic operation of the charging system for the supplemental battery.

7. In a charging system for a supplemental starting battery for trucks having a potential substantially above the standard voltage of its electrical system, a combination comprising, a generating unit operating at the standard voltage of the electrical system of the vehicle providing a D.C. source to operate the electrical system of the vehicle including the charging of a standard storage battery, means to regulate the voltage of the generating unit, means to convert the D.C. current into a pulsating current including switching transistors in push-pull connection, a transformer having a primary energized by said pulsating current and a secondary isolated from said primary to provide an alternating voltage of a desired higher voltage, and rectifier means to rectify the alternating current to D.C. current for charging said supplemental starting battery.

8. In an electrical system for an automotive vehicle, a standard electrical circuit including a source of electrical energy, a standard battery, an ignition system and other loading devices; a supplemental starting circuit including the standard battery, several additional batteries all connected in series with the standard battery, and a starting motor capable of being connected to the batteries during a starting period; and a charging circuit cooperating with the standard electrical circuit for deriving energy therefrom and connected to the supplemental starting circuit for charging the several additional batteries, said charging circuit having means for pulsating the energy derived from the standard circuit and transforming the energy to a higher voltage and means for rectifying said higher voltage in D.C. energy to charge the additional batteries.

9. In an electrical system for an automotive vehicle, a standard electrical circuit including a source of electrical energy, a standard battery, an ignition system and other loading devices; a supplemental starting circuit including the standard battery, several additional batteries all connected in series with the standard battery, and a starting motor capable of being connected to the batteries during a starting period; and a charging circuit cooperating with the standard electrical circuit for deriving energy therefrom and connected to the supplemental starting circuit for charging the several additional batteries, said charging circuit having transistor means for pulsating the energy, a transformer means to convert the energy to a higher A.C. potential and a rectifying means to convert the A.C. to a D.C. charging current for the additional batteries.

10. In a charging system for heavy duty vehicles using a standard D.C. battery power supply, a standard electrical generator operated at a standard D.C. voltage of the system to charge the battery of the standard power supply; and supplemental battery power supply for starting, said supplemental power supply having a potential substantially above the standard voltage of the standard power supply; and means to charge the batteries of said starter power supply by converting the D.C. current to a pulsating current by a transistor switching device and means to transform the energy to a higher A.C. voltage and to rectify the higher A.C. to D.C. to charge said batteries of the starter power supply.

References Cited by the Examiner

UNITED STATES PATENTS

| | | | |
|---|---|---|---|
| 2,251,630 | 8/41 | Leoffler et al. | 240—38 |
| 2,530,587 | 11/50 | Sorenson | 320—2 |
| 2,761,978 | 9/56 | Puimi | 320—16 |
| 2,826,731 | 3/58 | Paynter | 321—2 |
| 2,835,826 | 5/58 | Vados | 307—10 |
| 3,009,115 | 11/61 | Johnson | 321—2 |
| 3,012,205 | 12/61 | Brown | 321—2 |
| 3,070,737 | 12/62 | Johnson et al. | 321—2 |
| 3,105,910 | 10/63 | Chambers | 320—17 |

ORIS L. RADER, *Primary Examiner.*